(12) United States Patent
Schiel

(10) Patent No.: US 9,321,436 B2
(45) Date of Patent: Apr. 26, 2016

(54) BRAKE SYSTEM FOR MOTOR VEHICLES

(75) Inventor: Lothar Schiel, Hofheim (DE)

(73) Assignee: Continental Teves AG & Co. oHG (DE)

( * ) Notice: Subject to any disclaimer, the term of this patent is extended or adjusted under 35 U.S.C. 154(b) by 59 days.

(21) Appl. No.: 13/581,910

(22) PCT Filed: Mar. 29, 2011

(86) PCT No.: PCT/EP2011/054798
§ 371 (c)(1),
(2), (4) Date: Aug. 30, 2012

(87) PCT Pub. No.: WO2011/120955
PCT Pub. Date: Oct. 6, 2011

(65) Prior Publication Data
US 2013/0009456 A1    Jan. 10, 2013

(30) Foreign Application Priority Data

Mar. 29, 2010   (DE) .......................... 10 2010 003 380

(51) Int. Cl.
*B60T 13/74*    (2006.01)
*B60T 7/04*     (2006.01)
(Continued)

(52) U.S. Cl.
CPC .................. *B60T 7/042* (2013.01); *B60T 7/107* (2013.01); *B60T 11/224* (2013.01); *B60T 8/17* (2013.01); *B60T 13/148* (2013.01); *B60T 15/00* (2013.01)

(58) Field of Classification Search
CPC ......... B60T 8/17; B60T 8/343; B60T 8/4004; B60T 13/148; B60T 13/66; B60T 15/00; B60T 17/00; B60T 2270/404; B60T 7/042; B60T 7/107; B60T 11/224

USPC .......... 303/3, 13, 14, 15, 113.4, 114.1, 117.1, 303/20; 188/151 R, 152
See application file for complete search history.

(56) References Cited

U.S. PATENT DOCUMENTS 3,635,028 A    1/1972  Sherman
3,667,229 A    6/1972  Cresto
(Continued)

FOREIGN PATENT DOCUMENTS

DE   1195185    6/1965
DE   4240518    6/1994
(Continued)

OTHER PUBLICATIONS

International Search Report for PCT Application No. PCT/EP2011/054798 mailed Jun. 24, 2011.
(Continued)

*Primary Examiner* — Melody Burch
(74) *Attorney, Agent, or Firm* — RatnerPrestia

(57) ABSTRACT

A "brake-by wire" brake system for motor vehicles, with a brake master cylinder which can be actuated by a brake pedal and has a housing and a piston, which is arranged displaceably in the housing and, together with the housing, delimits a pressure space. The piston of the brake master cylinder is designed as a stepped piston with at least two hydraulic active surfaces A1, A2 of differing size, wherein a first, small active surface A1 is assigned to the pressure space, and a second, large active surface A2 is assigned to a filling space, and, after a closing travel has been overcome, the second, large hydraulic active surface A2 is effective and the active surface A2, A1 are switched over in dependence on a hydraulic pressure in the pressure space and on the pedal force, respectively.

11 Claims, 2 Drawing Sheets

(51) Int. Cl.
  *B60T 7/10*      (2006.01)
  *B60T 11/224*    (2006.01)
  *B60T 8/38*      (2006.01)
  *B60T 15/00*     (2006.01)
  *B60T 8/17*      (2006.01)
  *B60T 13/14*     (2006.01)

(56) References Cited

U.S. PATENT DOCUMENTS

| | | | |
|---|---|---|---|
| 3,946,564 A | | 3/1976 | Nakagawa |
| 6,033,035 A | * | 3/2000 | Neumann et al. .......... 303/113.4 |
| 2002/0142563 A1 | | 10/2002 | Sakai |
| 2004/0004392 A1 | * | 1/2004 | Kusano ...................... 303/114.1 |
| 2005/0183420 A1 | * | 8/2005 | Dasilva ............................ 60/584 |
| 2008/0067864 A1 | * | 3/2008 | Wong et al. ................ 303/113.5 |
| 2009/0210124 A1 | * | 8/2009 | Schonlau et al. ............... 701/70 |
| 2010/0181825 A1 | * | 7/2010 | Drumm et al. .......... 303/122.13 |
| 2010/0225159 A1 | | 9/2010 | Drumm |
| 2011/0115282 A1 | | 5/2011 | Dinkel et al. |
| 2012/0193975 A1 | | 8/2012 | Ishii |
| 2013/0049451 A1 | * | 2/2013 | Schiel ............................. 303/14 |
| 2014/0008966 A1 | | 1/2014 | Hotani |

FOREIGN PATENT DOCUMENTS

| | | |
|---|---|---|
| DE | 102 35 288 A1 | 4/2003 |
| DE | 10 2006 040 424 A1 | 3/2008 |
| DE | 102007049620 | 10/2008 |
| DE | 10 2009 033 499 A1 | 1/2010 |
| EP | 1878630 | 1/2008 |
| FR | 2464169 | 3/1981 |
| GB | 2179715 | 3/1987 |
| WO | 0172567 | 10/2001 |

OTHER PUBLICATIONS

International Search Report for PCT/EP2011/054815 mailed Jun. 27, 2011.

* cited by examiner

BRAKE SYSTEM FOR MOTOR VEHICLES

CROSS REFERENCE TO RELATED APPLICATIONS

This application is the U.S. National Phase Application of PCT/EP2011/054798, filed Mar. 29, 2011, which claims priority to German Patent Application No. 10 2010 003 380.4, filed Mar. 29, 2010, the contents of such applications being incorporated by reference herein.

FIELD OF THE INVENTION

The invention concerns a brake system for motor vehicles of the "brake-by-wire" type, with a brake master cylinder which can be activated by means of a brake pedal, with a housing and a piston arranged displaceably in the housing, which together with the housing delimits a pressure chamber to which wheel brakes are connected, a pressureless medium storage reservoir, a hydraulically activatable travel simulator which cooperates with the brake master cylinder and comprises at least one elastic element, which, in particular in a "brake-by-wire" operating mode, gives the vehicle driver a pleasant pedal feel, an electrically controllable, pneumatic, electric or electrohydraulic actuator unit for pressurizing the wheel brakes, a pressure regulator valve assembly for regulation and/or control of a wheel brake pressure set at a wheel brake, and an electronic control and regulating unit which controls or regulates the actuator unit and/or the pressure regulator valve assembly.

BACKGROUND OF THE INVENTION

"Brake-by-wire" brake systems are becoming increasingly common in automotive engineering. A generic electrohydraulic brake system for motor vehicles of the "brake-by-wire" type is known for example from DE 102 35 288 A1, which is incorporated by reference.

In "brake-by-wire" brake systems, the brake pressure necessary in service braking is provided without the direct involvement of the vehicle driver by the pneumatic, electric or electrohydraulic actuator unit. A so-called travel simulator gives the vehicle driver the pedal feel known from conventional brake systems. On failure of the "brake-by-wire" unit or the electrics/electronics, the vehicle is braked by hydraulic pressure which the driver generates exclusively by muscle power in the hydraulic brake master cylinder (unamplified fall-back level).

BRIEF DESCRIPTION OF THE INVENTION

The present invention is based on providing a brake system for motor vehicles of the "brake-by-wire" type which, in unamplified fall-back level, despite the legal pedal force limitation of 500N, allows braking also of large and heavy vehicles with an ergonomically optimized pedal travel up to the wheel lock limit.

This is achieved according to an aspect of the invention in that the piston of the brake master cylinder is formed as a stepped piston with at least two hydraulic active surfaces of different sizes, wherein a first, small active surface is allocated to the pressure chamber and a second, large active surface is allocated to a filling chamber, and the second, large, hydraulic active surface is active after overcoming a closing travel, and switching of the active surfaces takes place depending on a hydraulic pressure in the pressure chamber or the pedal force.

After overcoming the closing travel at the piston also present in normal operation ("brake-by-wire" operating mode), brake pressure is built up immediately and constantly in the wheel brake circuits. The activation force applied by the vehicle driver is used directly and without loss to build up pressure in the brake circuits.

BRIEF DESCRIPTION OF THE DRAWINGS

The invention is best understood from the following detailed description when read in connection with the accompanying drawing. Included in the drawing is the following figure.

The drawing shows diagrammatically.

DETAILED DESCRIPTION OF THE INVENTION

Figure 1:
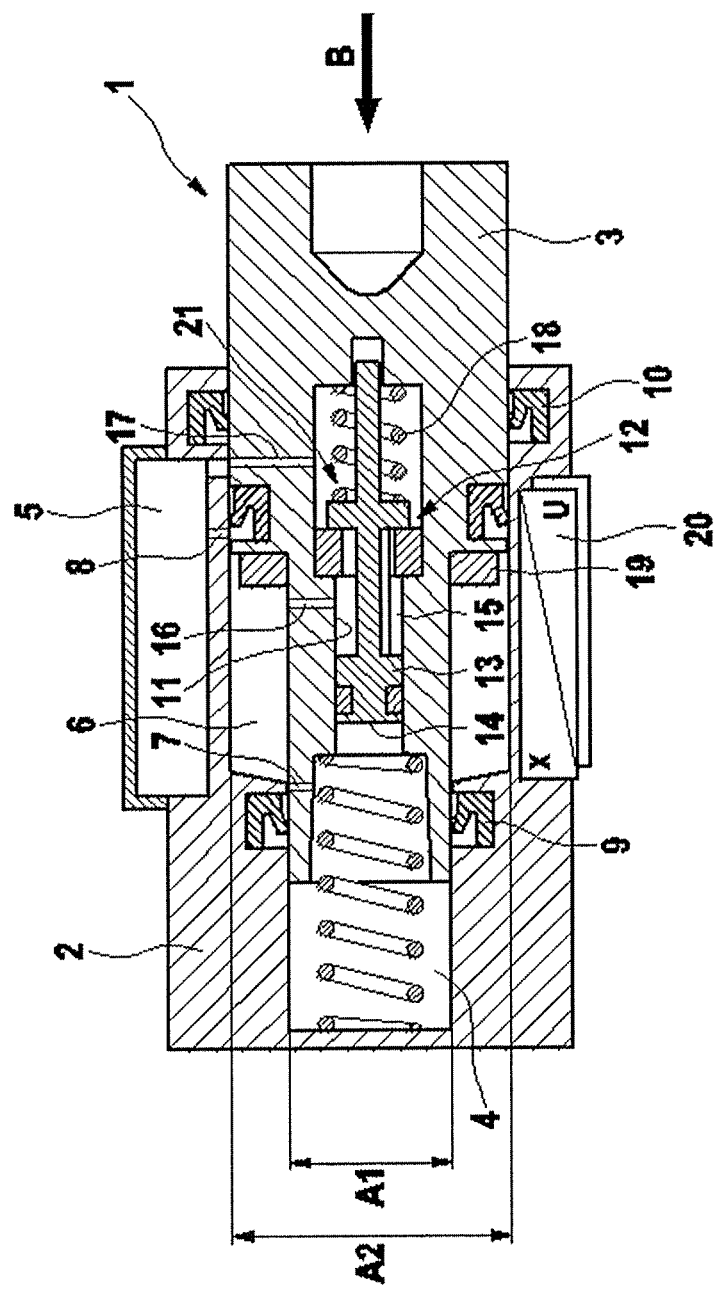
FIG. 1 a brake master cylinder of an embodiment example of a brake system according to the invention and FIG. 2 a depiction of the characteristics of the brake system according to the invention in the fall-back level.

A brake system according to the invention for motor vehicles of the "brake-by-wire" type comprises a brake master cylinder 1 which can be activated by means of a brake pedal not shown, with a housing 2 and a piston 3 arranged displaceably in the housing 2, which together with the housing 2 delimits a pressure chamber 4. Wheel brakes not shown are connected to the brake master cylinder 1 or the pressure chamber 4 in the known manner.

Furthermore the brake system comprises a pressureless medium storage reservoir 5 and a hydraulically activatable travel simulator which cooperates with the brake master cylinder 1 and comprises at least one elastic element, which, in particular in the "brake-by-wire" operating mode, gives the driver a pleasant pedal feel.

An electronic control and regulating unit controls or regulates a pneumatic, electric or electrohydraulic actuator unit to pressurize the wheel brakes, and a pressure regulator valve assembly to regulate and/or control the wheel brake pressure set at the wheel brakes.

The fundamental function and construction of a brake system for motor vehicles of the "brake-by-wire" type are known so that no more detailed description is required. Therefore only the features essential to the invention are described below.

On failure of the "brake-by-wire" unit or the electrics electronics, the vehicle is braked by hydraulic pressure which the driver generates exclusively by muscle power in the hydraulic brake master cylinder. This represents the unamplified fall-back level. Here, it is precisely the case that large and heavy vehicles which are becoming more and more widespread can scarcely be braked any more by way of the statutory pedal force limit of 500 N and by way of a short pedal travel.

The present invention is therefore based on providing a brake system for motor vehicles of the "brake-by-wire" type which, in unamplified fall-back level, despite the legal pedal force limitation of 500N, allows braking also of large and heavy vehicles with an ergonomically optimized pedal travel up to the wheel lock limit.

The piston 3 of the brake master cylinder 1 is formed according to the invention as a stepped piston with two hydraulic active surfaces A1, A2 of different sizes. The first, small active surface A1 is allocated to the pressure chamber 4 and the second, large active surface A2 is allocated to a filling chamber 6. In the context of the invention it is conceivable to provide three or more steps on the piston 3 so that three or more hydraulic active surfaces A1, A2, A3 to An of different sizes are formed, which are connected in succession in the manner of a register.

In an unactivated position of the brake master cylinder 1 shown in FIG. 1, both chambers 4, 6 are connected with the pressureless medium reservoir 5. As evident in FIG. 1, the piston 3 in a region of the first, small active surface A1 has one (or more) first connecting bore 7 which connects the pressure chamber 4 with the filling chamber 6 in the unactivated position. At the same time the filling chamber 6 is connected with the pressureless medium reservoir 5 via a connecting line 8. If the piston 3 is moved in activation direction B via activation of the brake pedal, the connecting bores 7 and the connecting line 8 are interrupted by the bypassing of sealing sleeves 9, 10, and a hydraulic pressure can be built up in the pressure chamber 4. After overcoming a closing travel therefore the second, large, hydraulic active surface A2 is active. Thus the brake system is filled over a short pedal travel and a vehicle deceleration of around 0.3 g can be achieved, and the activation force applied by the vehicle driver is used directly and without loss to build up pressure in the brake circuits.

The switching of the active surfaces from A2 to A1 takes place depending on a hydraulic pressure in the pressure chamber 4 or the pedal force.

For this, a valve assembly 21 is provided which is arranged in a central bore 11 of the piston 3. The valve assembly 21, as evident from FIG. 1, comprises a central valve 12 with a switching piston 13, wherein the switching piston 13 on its end face 14 is exposed to the pressure of the pressure chamber 4. Furthermore the switching piston 13 delimits a switching chamber 15 which is connected with the filling chamber 6 via a second connecting bore 16 formed in the piston 3.

If the switching piston 13 is moved by the pressure in the pressure chamber 4 against the pressure of a switching spring 18 against the activation direction B, to the left in the drawing, the central valve 12 opens and connects the switching chamber 15 with the pressureless medium reservoir 5 via a third connecting bore 17 formed in the piston 3, so that only the first, small, hydraulic active surface A1 of the piston 3 is still active.

After reaching a vehicle deceleration of around 0.3 g, the active surface of the brake master cylinder 1 is then switched to the smaller active surface A1. This allows the vehicle driver, via the small active surface A1 of the piston 3, to achieve braking with the legally permitted pedal force of 500N up to the blocking limit, depending on the brake system and mass of the vehicle. The pedal travel can here be kept in the ergonomically optimum range up to 100 mm.

If three or more active surfaces A1 to An are provided at the piston 3, it is conceivable to arrange the valve assemblies also in bores produced parallel to the central bore 11, each connected to the smallest pressure chamber 4 and to the pressureless medium reservoir 5.

To detect the activation travel of the brake master cylinder 1, a sensor device is proposed to detect movement and position of the piston 3, which device can be connected with the electronic control and regulating unit. As evident from FIG. 1, on the piston 3 is arranged a signal emitter 19, for example in the form of a magnet, and a sensor element 20 is attached stationary to the housing 2. Using the sensor device it is possible to sense the travel of the piston 3 and detect the driver's wish or generate a nominal value.

Advantageously the pressureless medium reservoir 5 can be provided integrated in the housing 2 of the brake master cylinder 1.

Figure 2:
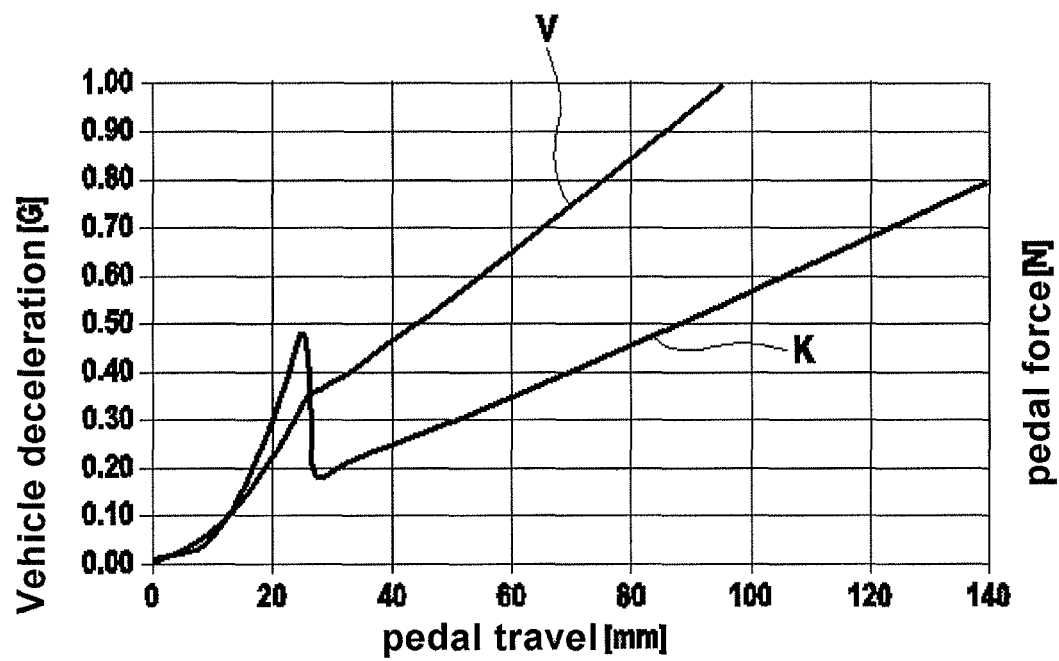

FIG. 2 furthermore shows an example depiction of a pedal travel-pedal force curve K and a pedal travel-vehicle deceleration curve V of the brake system according to the invention in the fall-back level, in the event of a failure of the on-board electrical system, for example.

LIST OF REFERENCE NUMERALS

1 Brake master cylinder
2 Housing
3 Piston
4 Pressure chamber
5 Pressureless medium reservoir
6 Filling chamber
7 Connecting bore
8 Connecting line
9 Sealing sleeve
10 Sealing sleeve
11 Central bore
12 Central valve
13 Switching piston
14 End face
15 Switching chamber
16 Connecting bore
17 Connecting bore
18 Switching spring
19 Signal emitter
20 Sensor element
21 Valve assembly
B Activation direction
K Pedal travel-pedal force curve
V Pedal travel-vehicle deceleration curve

The invention claimed is:

1. A brake-by-wire brake system for motor vehicles, with a brake master cylinder which can be activated by a brake pedal, with a housing having a stepped bore and a piston arranged displaceably in the stepped bore of the housing, which together with the housing delimits a pressure chamber to which wheel brakes are connected, a pressureless medium storage reservoir, a hydraulically activatable travel simulator which cooperates with the brake master cylinder and comprises at least one elastic element, which, in a brake-by-wire operating mode, gives the vehicle driver a pre-determined pedal feel, an electrically controllable, pneumatic, electric or electrohydraulic actuator unit for pressurizing the wheel brakes, a pressure regulator valve assembly for regulation and/or control of a wheel brake pressure set at a wheel brake, and an electronic control and regulating unit which controls or regulates the actuator unit and/or the pressure regulator valve assembly, wherein the piston of the brake master cylinder is formed as a stepped piston with at least two hydraulic active surfaces (A1, A2) of different sizes for delivering hydraulic fluid to the wheel brakes, wherein a first, small active surface (A1) of the piston is positioned in a small diameter portion of the stepped bore and is allocated to the pressure chamber and a second, large active surface (A2) of the piston is positioned in a large diameter portion of the stepped bore and is allocated to a filling chamber, and the second, large, hydraulic active surface (A2) is active after overcoming a closing travel, and switching of the active surfaces (A2, A1) takes place depending on a hydraulic pressure in the pressure chamber or the pedal force, and a valve assembly including a central valve arranged within a bore of the piston that is exposed to the pressure chamber, the central valve being moveable between an open position and a closed position with respect to a valve seat, wherein a pressure buildup in the pressure chamber causes the central valve to move away from the valve seat to the open position such that a fluid passageway is formed across the open central valve connecting the filling chamber with the pressureless medium storage reservoir.

2. The brake system as claimed in claim 1, wherein the switching of the active surfaces (A2, A1) takes place by the valve assembly including the central valve.

3. The brake system as claimed in claim 1, wherein the central valve delimits a switching chamber which is fluidly connected with the filling chamber, and, in the open position of the central valve, the switching chamber is connected with the pressureless medium storage reservoir.

4. The brake system as claimed in claim 3, wherein the brake master cylinder comprises a sensor device, which comprises a signal emitter and a sensor element, to detect movement and position of the stepped piston, wherein the signal emitter is arranged on the stepped piston, and the sensor element is attached to the housing.

5. The brake system as claimed in claim 1, wherein the pressureless medium storage reservoir is provided integrated in the housing of the brake master cylinder.

6. The brake system as claimed in claim 3, wherein the piston includes a first channel that fluidly connects the switching chamber to the filling chamber, a second channel that fluidly connects the switching chamber to the pressureless medium storage reservoir, and a third channel that fluidly connects the switching chamber to the pressure chamber.

7. The brake system as claimed in claim 6, wherein the first, second and third channels are passageways that are formed in a side wall of the piston.

8. The brake system as claimed in claim 3, wherein the piston includes a first channel that fluidly connects the switching chamber to the filling chamber.

9. The brake system as claimed in claim 8, wherein the piston includes a second channel that fluidly connects the switching chamber to the pressureless medium storage reservoir.

10. The brake system as claimed in claim 9, wherein the piston includes a third channel that fluidly connects the switching chamber to the pressure chamber.

11. The brake system as claimed in claim 10, wherein the first, second and third channels are passageways that are formed in a side wall of the piston.

* * * * *